United States Patent [19]

Sencer

[11] 4,071,713
[45] Jan. 31, 1978

[54] TELEPHONE SPEECH NETWORK

[75] Inventor: Mevhibe Gulay Sencer, Ottawa, Canada

[73] Assignee: Northern Telecom Limited, Montreal, Canada

[21] Appl. No.: 754,430

[22] Filed: Dec. 27, 1976

[51] Int. Cl.² ............................................. H04M 1/58
[52] U.S. Cl. ........................... 179/81 A; 179/170 NC
[58] Field of Search ................. 179/81 R, 81 A, 81 B, 179/170 NC, 170 T, 170.2, 16 F

[56] References Cited

U.S. PATENT DOCUMENTS

| 3,440,367 | 4/1969 | Holtz | 179/81 A |
|---|---|---|---|
| 3,462,560 | 8/1969 | Holzman | 179/170 NC |
| 3,823,272 | 7/1974 | Tabalba | 179/81 A |
| 3,955,053 | 5/1976 | Picard | 179/81 A |

Primary Examiner—Kathleen H. Claffy
Assistant Examiner—Joseph A. Popek
Attorney, Agent, or Firm—John E. Mowle

[57] ABSTRACT

An electronic circuit, for connecting a transmitter and receiver to a telephone line. The circuit operates on very low operating voltages from the line which allows parallel operation with a conventional set on long-loop applications. In its functional form, the circuit utilizes a bridge configuration having transistors in two of its legs, driven by the transmitter output, thereby eliminating the usual bridge balancing resistors therefrom and their concomitant operating voltage drops thereacross.

4 Claims, 3 Drawing Figures

TELEPHONE SPEECH NETWORK

This invention relates to an electronic speech network for connecting a transmitter and receiver to a telephone line of a line powered telephone set and more particularly to one permitting parallel operation with a conventional set in long-loop applications with very low d-c operating voltages and currents.

BACKGROUND OF THE INVENTION

Traditional speech networks for telephone sets have been constructed with a hybrid transformer, designed to provide some degree of isolation between signals that are simultaneously transmitted and received over a two-wire telephone line. The elimination of the hybrid transformer by using an electronic speech network results in a considerable size and weight reduction, while providing the opportunity for improvements in telephone system performance.

In a typical long-loop application, a minimum line current of 25mA must be drawn from the 48 volt central office batteries to operate the line relays therein. In such an application, the I-R drop along the telephone line limits the d-c voltage drop across the telephone set to 5 volts; and hence its d-c terminal resistance to about 200 ohms. However, since electronic networks, particularly those constructed in integrated circuit form, are susceptible to voltage surges on the line such as caused by lightning strikes etc., surge protection must be provided. This generally necessitates the use of a Zener diode protection circuit including a resistor in series with the line of the order of 47 ohms. In addition, a bridge connected polarity guard must also be connected in series with the electronic network to protect it against polarity reversals from the central office. With about a 1.2 volt drop across the 47 ohm resistor, and another 1 volt drop across the polarity guard, the actual d-c voltage available across the input to the electronic network may well be limited to about 2.8 volts. If the telephone set is to provide a 4 volt peak-to-peak signal (2 volts zero-to-peak) then the network itself must be capable of operating down to $2.8 - 2 = 0.8$ volts without clipping the speech signal. However, a typical bipolar transistor has a voltage drop of about 0.6 volts between its base-emitter junction when operating. Consequently this places severe limitations on a network which must operate down to 0.8 volts.

Various such electronic speech networks have been proposed in the past, some utilizing the gyrator principle while others are based on a bridge configuration, to provide the necessary anti-sidetone balance for the telephone set. One such circuit based on this latter concept is disclosed in U.S. Pat. No. 3,440,367 entitled "Non-Reactive Anti-Sidetone Network for a Telephone Set" invented by R. E. Holtz, issued June 2, 1970. Another such circuit is disclosed in U.S. Pat. No. 3,823,272 entitled "Electronic Telephone Transmission Circuit" invented by C. M. Tabalba issued July 9, 1974; while still another is disclosed in applicant's copending United States application Ser. No. 649,557 entitled "Telephone Speech Network" filed Jan. 15, 1976, also invented by G. Spencer now U.S. Pat. No. 4,031,331.

In these electronic hybrid networks of the prior art, a resistor is connected in series with the output of the transmit amplifier across the telephone line, in order to balance the bridge configuration. However, this results in a portion of the transmit signal appearing across this resistor, which is out-of-phase with that across the telephone line. For instance, referring to the attached FIG. 1 (which illustrates a functional circuit diagram of a bridge configuration that is typical of those shown in Holtz and uses the same reference characters as Tabalba) a portion of the transmit signal $V_S$ generated by TR1 is dropped across resistor R5 and the balance across the telephone line impedance ZL. In this bridge arrangement, the transmit signal developed across resistor R5 provides an out-of-phase source which is coupled through resistor R4 and effectively cancels the transmit signal across the input to the receiver coupled from the telephone line through ZB. However, because of the signal drop across resistor R5, the output of the transmitter TR1 must be capable of handling a considerably larger transmit signal without clipping, thus requiring a larger d-c operating voltage across the line terminals of the set. Since the supply voltage from the central office is fixed (nominally 48 volts d-c) the requirement for a higher d-c terminal voltage across the telephone set restricts the loop length. In addition, when such an electronic telephone is placed in parallel with a conventional hybrid transformer telephone in a long-loop application, the heavy current drain of the latter reduces the available voltage on the line to the point where the electronic network may cease to function altogether. Consequently sets employing such electronic networks have generally not met all the operating requirements to enable them to work in parallel with conventional sets on long-loop applications.

STATEMENT OF THE INVENTION

The present invention substantially overcomes this disadvantage of the prior circuits by providing a bridge connected electronic network in which the output transistors of the transmit amplifier are effectively connected directly across the telephone line (i.e. in one leg of the bridge) without the necessity for the series resistor utilized in the prior art. In essence, this permits a lower d-c operating voltage for the set. At first view, this would appear to upset the normal bridge configuration so that transmit signals would appear across the input to the receiver. However, this is balanced out by including another transistor in a second leg of the bridge which is so connected as to introduce transmit signals which are out-of-phase with those on the line across the input to the receiver.

Thus, the present invention provides a telephone speech network for connecting a transmitter and receiver to a telephone line, comprising: a plurality of transistors each having their emitter-collector effectively connected in shunt with the telephone line for providing a signal varying impedance which controls the current drawn from the line across the terminals of the network; a line powered transmit amplifier, for coupling the output of said transmitter to the base of each of the plurality of transistors, the emitter-collector of one of said transistors being connected in series with the input to a line powered receive amplifier across the telephone line. In addition, the network includes a balancing impedance connected in shunt with the emitter-collector of that one transistor for coupling received signal currents from the line to the receive amplifier input and in conjunction with said one transistor to control the sidetone level of the transmit signals coupled to said input. The receive amplifier couples the amplified received signal currents in turn to said receiver.

In a particular embodiment, the input to the receive amplifier comprises a diode connected in series aiding with said one transistor across the line. The diode in turn has the base-emitter of a matching transistor connected in shunt therewith so that its emitter-collector current is substantially the same as, or a multiple of, that of said diode.

BRIEF DESCRIPTION OF THE DRAWINGS

An example embodiment of the invention will now be described with reference to the accompanying drawings in which.

DESCRIPTION OF THE PREFERRED EMBODIMENT

In the following detailed description, several of the components have been left undesignated and are not described in detail where their function would be obvious to those skilled in the art.

Figure 1:
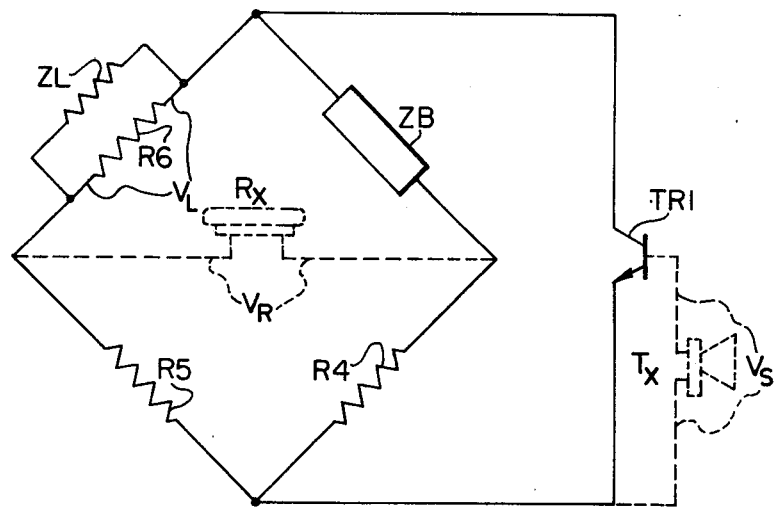
FIG. 1 illustrates a functional circuit diagram of a hybrid network for connecting a transmitter and receiver to a telephone line in accordance with the prior art.
Figure 2:
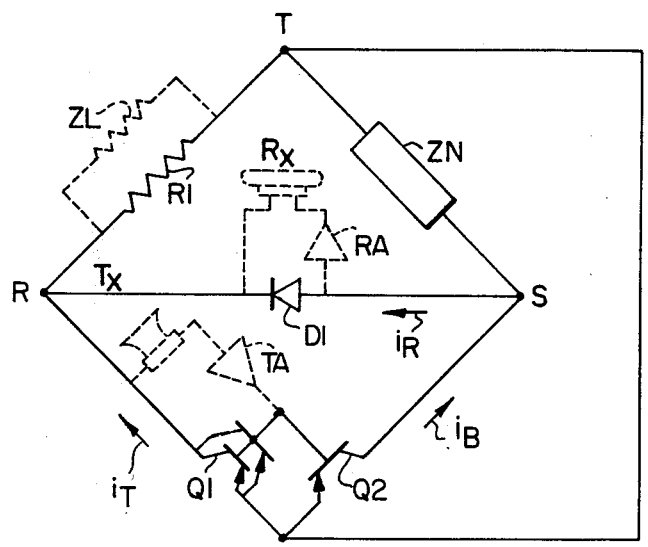
FIG. 2 illustrates a function circuit diagram of a hybrid network for connecting a transmitter and receiver to a telephone line in accordance with the present invention.

The functional bridge configuration illustrated in FIG. 2. of the present invention comprises the basic four branches of the bridge which include a terminating resistance R1 and a telephone line impedance ZL connected in shunt between the tip and ring (T-R) of the telephone line; output transistors Q1 of the transmit amplifier having their emitter-collectors also connected between T-R; a bridging transistor Q2 connected between T and S; and a bridging impedance ZN also connected between T and S. Receive signal currents $i_R$ resulting from signal currents flowing primarily through ZN develop a voltage across a diode D1 which functions as the input to a receive amplifier RA. The output of the amplifier RA in turn is used to drive a receiver Rx. The output of a transmitter Tx is coupled through a transmit amplifier TA to the bases of both transistors Q1 and Q2. The former develops the majority of the transmit signal current $i_T$ directly across the T-R of the telephone line. A balancing signal current $i_B$ is however generated by transistor Q2 to provide the required sidetone level in conjunction with the transmit signals coupled from T-R through impedance ZN. To balance the bridge, the following relationship must exist for transmit signal currents:

$$\frac{i_B}{i_T} = \frac{\frac{ZL \cdot R1}{ZL + R1}}{ZN}$$

In a typical circuit the impedance of the parallel combination of ZL - R1 is about one-tenth that of ZN. Hence the transmit signal current $i_T$ must be about 10 times that of $i_B$. In an integrated circuit structure, each of the transistors has the same operating characteristics. Consequently, $i_T$ can be made 10 times that of $i_B$ by connecting 10 transistors in parallel for Q1. Since each of the ten transistors in Q1 and the single transistor Q2 draws substantially equal amounts of current, then the total current drawn by Q1 will be 10 times that of Q2. Also, it can be seen that with this arrangement, the transmit signal developed across the output of Q1 is applied directly to T-R of the telephone line without the usual load resistance in series therewith. As a result, the network is inherently capable of functioning with a very low operating voltage supplied from the line.

Figure 3:
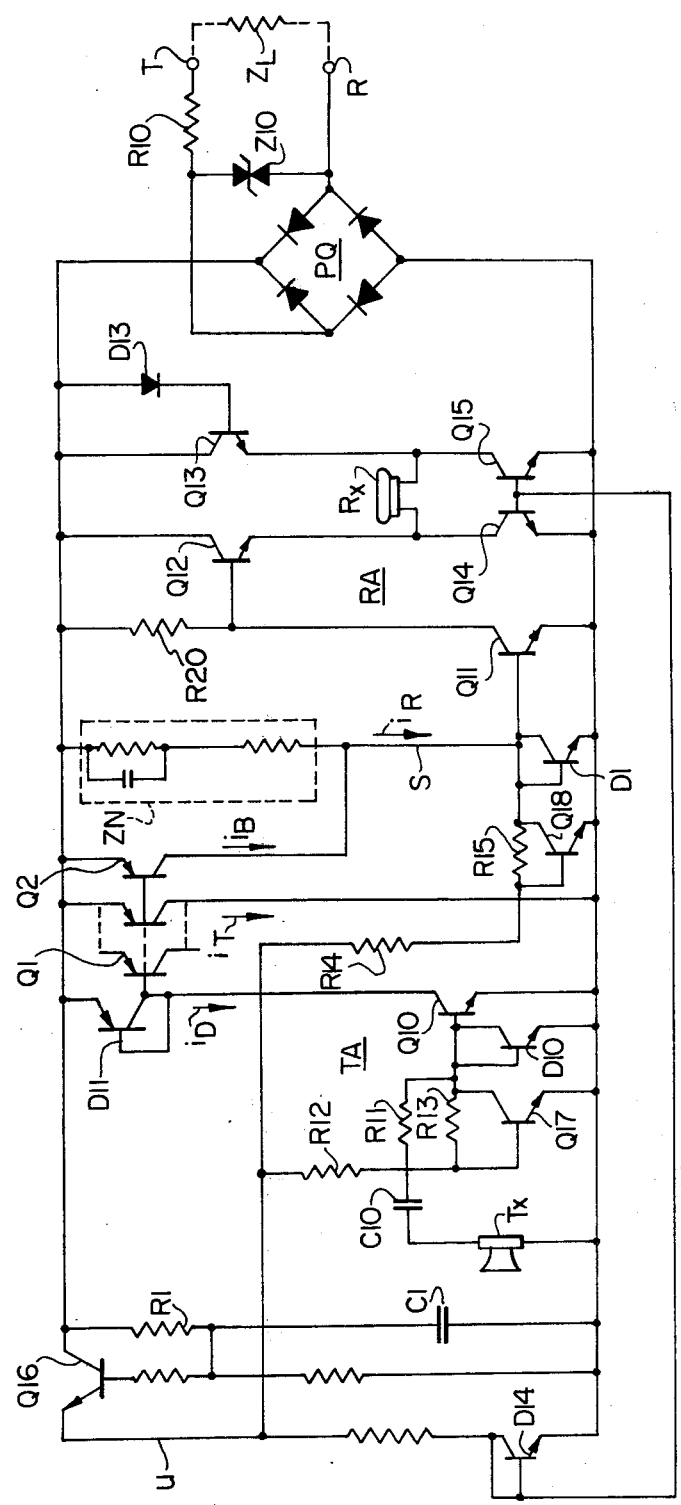
FIG. 3 illustrates a schematic circuit diagram of a telephone speech network based on the functional network illustrated in FIG. 2.

One realization of the functional circuit shown in FIG. 2 is illustrated in the detailed schematic diagram of FIG. 3. The basic components have identical reference characters to those used in FIG. 2. This detailed structure will be readily apparent from the following description of the function and operation of this circuit.

The electronic network is connected between tip T and ring R of the telephone line through a voltage surge protection circuit comprising a series resistor R10 and a shunt Zener diode Z10. In addition, a bridge connected polarity guard PG is also connected across the line. It will be understood however that the series resistance of these components (nominally less than 100 ohms) is relatively small compared to the 1300 ohm line impedance when the set is operating under long-loop conditions. Consequently, the balance of the electronic network is effectively connected directly across the line terminals T-R of the telephone set.

The operation of the circuit will first be described for transmit signals. Output signals from the transmitter Tx are coupled through capacitor C10 and resistor R11 across diode D10. The signal is then amplified by transistor Q10 which provides a substantially constant signal current source through diode D11. Since the base-emitter junctions of transistors Q1 and Q2 are in shunt with diode D11, the voltage drop across them is the same. Consequently, the emitter current through each of the transistors Q1 and Q2 is approximately the same as the current through the diode D11. However, since the majority of this emitter current is coupled through their collectors and only a small portion through their bases, then the following relationship exists:

$$\frac{\text{(total no. of transistors } Q1\text{-}Q2)}{\text{single diode } D11} = \frac{i_T}{i_D}$$

It can be seen therefore that current amplification of the signal current $i_D$ through the diode D11 can be readily achieved. Since the voltage drop across diode D11 is about 0.6 volts and the saturation emitter-collector voltage of Q10 about 0.1 volt, it can be seen that the network (excluding the voltage protection circuitry) will function down to about 0.6 + 0.1 = 0.7 volts without clipping of the transmit signal occurring. Similarly, transistor Q2 and diode D1 will function down to a working voltage of about 0.7 volts without clipping of the receive signal. Because of the relatively low voltage drop across the network with respect to that dropped along the telephone line, the transistors Q1, Q2 and Q10 jointly control the transmit signal current which the telephone set draws from the telephone line. The transmit signal appearing between T and R results in a signal current flow through ZN which appears across diode D1. However, this current is out-of-phase with the transmit signal current developed by Q2. The magnitudes of these two currents are such that the required sidetone level is obtained in the receiver so that a party using the telephone will not receive the impression that the line is dead.

In the receive mode, received signals on the telephone line appearing between T-R are coupled through the input protection circuitry and are primarily terminated by resistor R1 which is a-c coupled across the line by capacitor C1. The received signals also generate the received signal current $i_R$ through balancing inpedance ZN and appear across diode D1 on the input of the receive amplifier RA. In a similar manner to that of the transmit amplifier, the signals across diode D1 are amplified by transistor Q11 which functions as a source of constant signal current for resistor R20. The received signal across the resistor R20 is coupled to the base of transistor Q12. Transistors Q12 and Q13 are series connected with transistors Q14 and Q15 respectively in a balanced configuration effectively across T-R of the line. Transistors Q14 and Q15 which are controlled by diode D14 provide a substantially constant current source for transistors Q12 and Q13. The base of transistor Q13 is driven out-of-phase with that of Q12 through diode D13 which is connected directly to one side of the line. As a result, the received signal voltage between the emitters of the two transistors 12 and 13 is applied to the receiver Rx.

Both the transmit and receive amplifiers TA and RA utilize amplitude equalization to achieve constant receive and transmit levels over a wide range of loop lengths. To achieve this the applied d-c voltage on the line is filtered by transistor Q16 to remove the a-c component and provide a d-c voltage at U which is proportional to the line length. In the transmit amifier TA, the line length dependent d-c voltage from U is coupled through resistor R12 and is applied to the base of transistor Q17. As the voltage at U decreases with longer loop lengths, the applied voltage at the base of transistor Q17 decreases correspondingly lowering the current flow therethrough thereby decreasing the loading across the diode D10. This increases the transmit signal level applied to the base of transistor Q10. The difference between the emitter-base voltages of the transistor Q17 and diode D10 is determined by the voltage drop across resistor R13 which in turn is determined by the d-c current flowing through resistor R12. This d-c current and the a-c signal current flowing through resistor R11 from the transmitter Tx divides between transistor Q17 and diode D10. The a-c signal current is coupled to the transmit amplifier and is small with respect to the current through resistor R12. Consequently, the gain of the transmit amplifier TA is inversely proportional to the voltage at U.

Similarly, transistor Q18 and resistors R14 and R15 control the amplitude of the received signal applied to the base of transistor Q11. Thus the gain of the receive amplifier is made inversely proportional to the voltage at U and hence the loop length of the telephone line.

If it is desired to still further increase the transmit signal current drive to the line, the collector outputs of transistors Q1 can be coupled through a series aiding diode (not shown) across the line. The base-emitter junctions of a plurality of NPN transistors (also not shown) are then connected in shunt with this diode while their collectors are connected to the other side of the line. The configuration resembles diode D11 - transistors Q1 with the exception that their emitters are connected to the other side of the line. Again however, the added diode adds very little resistance in series with the transistors Q1 and hence the latter are still effectively connected to T-R.

What is claimed is:

1. A telephone speech network for connecting a transmitter and receiver to a telephone line, comprising:
   a plurality of transistors each having their emitter-collectors effectively connected in shunt across said telephone line for providing a signal varying impedance across the line terminals of the network;
   a line powered transmit amplifier for coupling the output of said transmitter to the base of each of the plurality of transistors, the emitter-collector of one of said transistors being connected in series with the input to a line powered receive amplifier across the telephone line;
   a balancing impedance connected in shunt with the emitter-collector of said one transistor for coupling receive signal currents from said line to said receive amplifier input and in conjunction with said one transistor to control the sidetone level of the transmit signals coupled to said input; and
   said receive amplifier coupling the amplified received signal currents to said receiver.

2. A telephone speech network as defined in claim 1 in which the input to said receive amplifier comprises a diode connected in series aiding with said one transistor and in which the input to the receive amplifier comprises a further transistor having a base-emitter connected directly in shunt with said diode whereby the collector signal current of said further transistor is substantially the same as that of said diode.

3. A telephone speech network as defined in claim 1 which includes a terminating resistance effectively connected in shunt with said telephone line.

4. A telephone speech network as defined in claim 3 in which the ratio of transmit signal currents is substantially equal to:

$$\frac{i_B}{i_T} = \frac{\frac{ZL \cdot R1}{ZL + R1}}{ZN}$$

where:
   $i_B$ = the transmit signal current from said one transistor,
   $i_T$ = the transmit signal currents from the balance of said plurality of transistors,
   ZL = the impedance of the telephone line,
   R1 = the resistance of said terminating resistance, and
   ZN = the impedance of said balancing impedance.

* * * * *